United States Patent
Kang et al.

(10) Patent No.: US 12,296,326 B2
(45) Date of Patent: May 13, 2025

(54) CATALYST FOR SYNTHESIS OF HYDROGEN PEROXIDE AND RECOVERY, AND METHOD OF PREPARING SAME

(71) Applicant: HEESUNG CATALYSTS CORPORATION, Gyeonggi-do (KR)

(72) Inventors: Dong Kun Kang, Gyeonggi-do (KR); Young Ho Lee, Gyeonggi-do (KR); Young-San Yoo, Incheon (KR)

(73) Assignee: HEESUNG CATALYSTS CORPORATION, Gyeonggi-do (KR)

( * ) Notice: Subject to any disclaimer, the term of this patent is extended or adjusted under 35 U.S.C. 154(b) by 711 days.

(21) Appl. No.: 17/619,701

(22) PCT Filed: Jun. 9, 2020

(86) PCT No.: PCT/KR2020/007437
§ 371 (c)(1),
(2) Date: Dec. 16, 2021

(87) PCT Pub. No.: WO2020/256328
PCT Pub. Date: Dec. 24, 2020

(65) Prior Publication Data
US 2022/0331789 A1     Oct. 20, 2022

(30) Foreign Application Priority Data
Jun. 21, 2019   (KR) .................. 10-2019-0074204

(51) Int. Cl.
*B01J 35/30*     (2024.01)
*B01J 23/58*     (2006.01)
(Continued)

(52) U.S. Cl.
CPC ............ *B01J 35/396* (2024.01); *B01J 23/58* (2013.01); *B01J 23/63* (2013.01); *B01J 35/399* (2024.01);
(Continued)

(58) Field of Classification Search
CPC ........ B01J 35/396; B01J 35/51; B01J 35/395; B01J 35/397; B01J 35/398; B01J 35/399;
(Continued)

(56) References Cited

U.S. PATENT DOCUMENTS

| | | | | |
|---|---|---|---|---|
| 3,271,327 A | * | 9/1966 | McEvoy | B01D 53/864 |
| | | | | 423/592.1 |
| 2008/0305033 A1 | * | 12/2008 | Carley | B01J 37/06 |
| | | | | 502/262 |

(Continued)

FOREIGN PATENT DOCUMENTS

| | | | | |
|---|---|---|---|---|
| CN | 1175931 C | * | 11/2004 | ............ B01J 23/44 |
| CN | 101497040 | | 8/2009 | |

(Continued)

OTHER PUBLICATIONS

International Search Report and Written Opinion was mailed on Oct. 7, 2020 by the International Searching Authority for International Application No. PCT/KR2020/007437 filed on Jun. 9, 2020 and published as WO 2020/256328 (Applicant-Heesung Catalysts Corporation) (8 pages).

*Primary Examiner* — Patricia L. Hailey
(74) *Attorney, Agent, or Firm* — Ballard Spahr LLP (57) ABSTRACT

Described is a catalyst for preparing hydrogen peroxide by an anthraquinone process and for regenerating a working solution and a method of preparing the catalyst. The catalyst contains palladium, magnesium, and cerium components uniformly distributed in alumina. Alternatively, the catalyst contains a palladium component distributed in a ring shape in an alumina sphere and magnesium and cerium components uniformly distributed in the alumina.

5 Claims, 5 Drawing Sheets

(51) Int. Cl.
  *B01J 23/63* (2006.01)
  *B01J 35/51* (2024.01)
  *B01J 37/02* (2006.01)
  *B01J 37/08* (2006.01)
  *C01B 15/023* (2006.01)

(52) U.S. Cl.
  CPC .......... *B01J 35/51* (2024.01); *B01J 37/0201* (2013.01); *B01J 37/08* (2013.01); *C01B 15/023* (2013.01); *B01J 2523/22* (2013.01); *B01J 2523/3712* (2013.01); *B01J 2523/824* (2013.01)

(58) Field of Classification Search
  CPC ........ B01J 23/58; B01J 23/63; B01J 37/0201; B01J 37/08; B01J 2523/22; B01J 2523/3712; B01J 2523/824; C01B 15/023
  USPC ........ 502/107, 304, 328, 339, 355; 423/582, 423/584, 588
  See application file for complete search history.

(56) References Cited

U.S. PATENT DOCUMENTS

2009/0018013 A1  1/2009  Hasegawa et al.
2010/0331175 A1*  12/2010  Liang .................... B01J 23/002
                                                              502/303

FOREIGN PATENT DOCUMENTS

| CN | 106423200 B | * | 8/2019 | ............. B01J 23/63 |
| JP | 2006-511334 A | | 4/2006 | |
| JP | 2009-034663 A | | 2/2009 | |
| KR | 10-1997-0069122 | | 11/1997 | |
| KR | 10-2009-0016561 A | | 2/2009 | |
| KR | 10-2009-0006733 | | 11/2014 | |
| WO | WO 2004/060553 A1 | | 7/2004 | |

* cited by examiner

CATALYST FOR SYNTHESIS OF HYDROGEN PEROXIDE AND RECOVERY, AND METHOD OF PREPARING SAME

CROSS-REFERENCE TO RELATED APPLICATIONS

This application is a U.S. National Phase Application of International Application No. PCT/KR2020/007437, filed Jun. 9, 2020, which claims priority to Korean Application No. 10-2019-0074204, filed Jun. 21, 2019, each of which are hereby incorporated by reference in their entirety.

TECHNICAL FIELD

The present disclosure relates to a catalyst for producing hydrogen peroxide through an anthraquinone method and for regenerating a working solution and to a method of preparing the catalyst.

BACKGROUND ART

Hydrogen peroxide ($H_2O_2$) is a chemical product used in various ways in brightening agents, disinfectants, pharmaceuticals, oxidizing agents, and the like. Hydrogen peroxide is produced by a direct synthesis method using hydrogen and oxygen or an anthraquinone method using a continuous hydrogenation and oxidation process of an anthraquinone compound. Hereinafter, the anthraquinone method will be briefly described.

Hydrogen peroxide may be produced by repeatedly hydrogenating and oxidizing a working solution in which an alkyl anthraquinone, which is commonly referred to as 2-ethyl-anthraquinone (EAQ), is dissolved in an appropriate organic solvent. When such hydrogenation and oxidation are repeated, tetrahydroanthraquinone (THAQ) and the like may be accumulated in the working solution as by-products, and coke may be deposited on a catalyst, thereby lowering efficiency of the hydrogen peroxide production and the regeneration. In particular, Korean Patent Application Publication No. 10-2009-0006733 describes a technology of regenerating THAQ, which is a by-product, into anthraquinone using a catalyst obtained by loading magnesium on activated alumina in a working solution at a temperature of 40° C. to 150° C. and treating the resultant substance with ammonia before calcining the substance.

DISCLOSURE

Technical Problem

However, there still was a need for development of a catalyst that would catalyze the hydrogenation process in the production of hydrogen peroxide while also improving regeneration efficiency. During research and development of the anthraquinone method, the present inventors found that loading palladium on an alumina carrier impregnated with magnesium and cerium not only increases efficiency of regeneration compared to a cerium-free catalyst but also increases efficiency of hydrogenation in the anthraquinone method, thereby completing the disclosure. In addition, it was confirmed that the addition of cerium led to an increased amount of oxygen adsorption, thereby being advantageous for catalyst regeneration.

Technical Solution

The present disclosure relates to a catalyst which catalyzes a hydrogenation step in a hydrogen peroxide production process by an anthraquinone method and improves efficiency of regenerating a working solution. The present disclosure also relates to a method of preparing the catalyst.

The present inventors found that when a catalyst obtained by loading magnesium and cerium on activated alumina followed by calcination, impregnation with palladium, and reduction is used for regeneration of a working solution, regenerative conversion can be efficiently performed. Surprisingly, the inventors found that the catalyst can be applied as a catalyst in the hydrogenation step in the hydrogen peroxide production process by the anthraquinone method.

The present disclosure provides the catalyst applied to the hydrogenation step in the production of hydrogen peroxide by the anthraquinone method or the catalyst for regenerating the working solution used for the production of hydrogen peroxide by the anthraquinone method, in which the catalyst may be palladium, magnesium, and cerium components uniformly distributed in alumina or may be a palladium component distributed in an alumina core and magnesium and cerium components uniformly distributed in the alumina. In addition, the present disclosure also provides the method of producing the catalyst in which activated alumina may be impregnated with aqueous solutions of magnesium and cerium, calcined, and then treated with an aqueous solution of palladium to load the alumina with a palladium component. Without being limiting, in the present disclosure, the contents of magnesium and cerium impregnated in the activated alumina may be 1 to 10 wt % and 0.10 to 0.25 wt %, respectively, of the magnesium- and cerium-impregnated activated alumina after calcination, or the content of palladium loaded after the calcination may be 0.1 to 10 wt % of the catalyst after the loading.

Advantageous Effects

Reactivity and durability may be improved by the hydrogenation catalyst according to the present disclosure, thereby increasing efficiency of the overall anthraquinone method, and the regeneration catalyst may be used to selectively regenerate by-products that cannot generate hydrogen peroxide into effective anthraquinone while preventing degradation of the anthraquinone or an organic solvent.

BEST MODE

Hereinafter, the present disclosure will be described in detail.

The present disclosure relates to a catalyst obtained by loading magnesium and cerium onto activated alumina, followed by calcination, impregnation with palladium, and reduction, and a method of preparing the same. A use of the catalyst in regeneration of a working solution and in a hydrogenation step of anthraquinone production process has been found to enable efficient regenerative conversion and hydrogenation, respectively. Hereinbelow, characteristic steps of the present disclosure will be described.

1) Loading Magnesium and Cerium onto Activated Alumina as a Carrier

An Mg—Ce complex corresponding to a total pore volume of the carrier may be prepared, and the carrier may be impregnated using a loading method. After the impregnation, homogenization may be performed while letting the alumina flow in an atmosphere of air to obtain a uniform metal concentration inside the carrier, and then the resulting carrier may be dried at 100° C. to 150° C. for 24 hours. After the drying, organic matter and nitrogen oxides may primarily be removed at 200° C. to 400° C. in the atmosphere of air, and then a calcination process may be performed at 500-700° C. When heat treatment is performed at 500° C. or less, the loaded metals may not change into metal oxides. When the heat treatment is performed at 700° C. or higher, the metals become agglomerated, thereby causing a problem of a decreased in catalytic activity. Contents of the magnesium and cerium impregnated in the activated alumina may be 1 to 10 wt % and 0.10 to 0.25 wt %, respectively, of a weight of the magnesium- and cerium-impregnated activated alumina after calcination. When the magnesium content is below the lower limit, durability and thermal stability of the catalyst may be reduced, and when the magnesium content exceeds the upper limit, dispersion of palladium, which is an active material, may be reduced. In addition, when the cerium content is below the lower limit, efficiency during the regeneration of the catalyst may be reduced, and a cerium content exceeding the upper limit may cause a decrease in the catalytic activity.

2) Loading Palladium as Active Metal onto Magnesium-Cerium-Alumina Composite Oxide The magnesium-cerium-alumina composite oxide as a carrier may be loaded with 1 wt % of an aqueous solution of saturated palladium complexes and then reduced to obtain a final catalyst. The loading with the aqueous solution of palladium may preferably be performed for 30 minutes to 20 hours at a temperature of 50° C. to 80° C. The reduction may preferably be performed for 30 minutes to 30 hours at a temperature of 40° C. to 70° C. A content of the palladium loaded may be 0.1 to 10 wt % of the catalyst after the loading. When the loaded palladium content is less than 0.1 wt %, initial performance and durability of the catalyst may be reduced, and when the content exceeds 10 wt %, the dispersion may be reduced due to agglomeration of the palladium particles, thereby reducing the activity.

Specific examples will be described below.

Example 1

Gamma alumina was used as the carrier in Example 1, and boehmite available from BASF headquartered in Germany and having a specific surface area of 250 m$^2$/g, a pore volume of 0.55 cm$^3$/g, and an average pore size of 8.6 nm was used after calcination at 600° C. After the calcination, the alumina was in a gamma phase and had a specific surface area of 180 m$^2$/g.

Magnesium nitrate (Mg(NO$_3$)$_2$.6H$_2$O) was used as a precursor of magnesium, cerium nitrate (Ce(NO$_3$)$_3$.6H$_2$O) was used as a precursor of cerium, and palladium chloride (H$_2$PdCl$_4$) was used as a precursor of the active metal.

First, magnesium nitrate and cerium nitrate corresponding to 5.0% and 0.5%, respectively, of the total weight of the catalyst were mixed with ionized water.

The prepared solution of Mg—Ce complex was impregnated into the carrier using an incipient wetness method. The composition loaded with Mg—Ce was heat-treated at 550° C. in the atmosphere of air for 2 hours to fix the metal.

Then, 100 g of the composition loaded with Mg—Ce was added to 200 ml of water, a precursor of palladium corresponding to 1.0% of the total weight of the catalyst and ethylene glycol and hydrochloric acid corresponding to 3.0% of the total weight of the catalyst were added, and the temperature was raised to 80° C. while stirring and maintained for 30 minutes.

The catalytic reduction process was carried out by introducing a reducing agent to the complex loaded with Mg—Ce—Pd. As the reducing agent, sodium formate (NaCOOH) was used.

Figure 1:
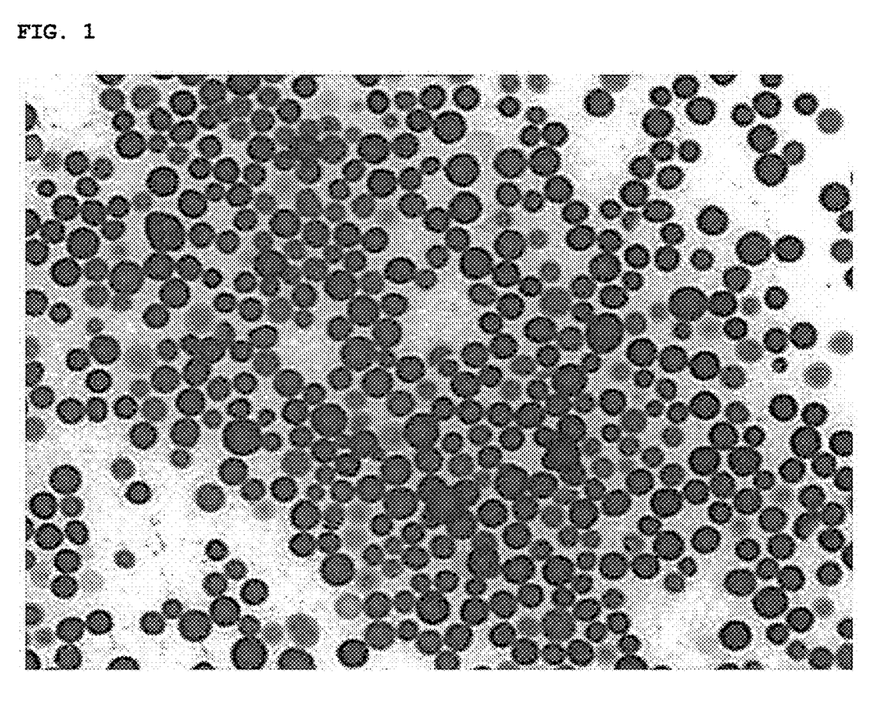
FIG. 1 shows catalyst powder (D90=150 μm) prepared in examples.
Figure 2:
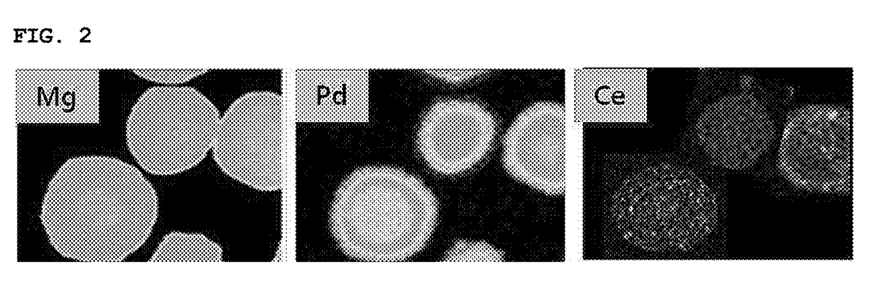
FIG. 2 shows a distribution of components inside the powder, in which magnesium and cerium are uniformly distributed inside a carrier but palladium mainly shows a ring-shaped structure spaced apart from the outer edge of the carrier and having a thickness of 10 to 20 μm.

FIG. 1 shows the prepared catalyst powder (D90=150 μm). FIG. 2 shows magnesium and cerium uniformly distributed inside the carrier and palladium mainly in a ring-shaped structure spaced apart from the outer edge of the carrier and having a thickness of 10 to 20 μm. The ring-shaped structure exists in a form of a ring 5 to 8 μm away from the surface of the carrier, and the structure may be advantageous in reducing a phenomenon of physical loss due to an impact in a fluidized bed reaction for the production of hydrogen peroxide.

Example 2

In Example 2, a magnesium-palladium complex, excluding cerium, was prepared. The composition of magnesium and palladium was prepared in the same manner as in Example 1.

Example 3

In Example 3, a catalyst was prepared in the same manner as in Example 1, except that a content of cerium oxide after the calcination was prepared to be 2.0% of the total weight. Similar to Example 1, magnesium and cerium were uniformly distributed inside the carrier, and palladium was mainly distributed away from the outer edge of the carrier to have a thickness of 20 μm.

Example 4

Figure 3:
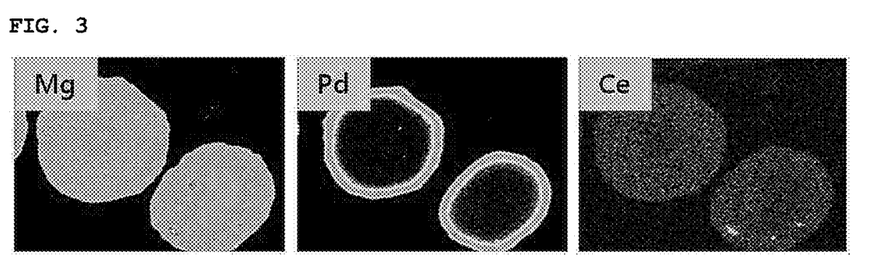
FIG. 3 shows a distribution of components having a different structure inside the powder according to an embodiment, in which magnesium and cerium are uniformly distributed inside the carrier and palladium is also uniformly distributed inside the catalyst.
Figure 4:
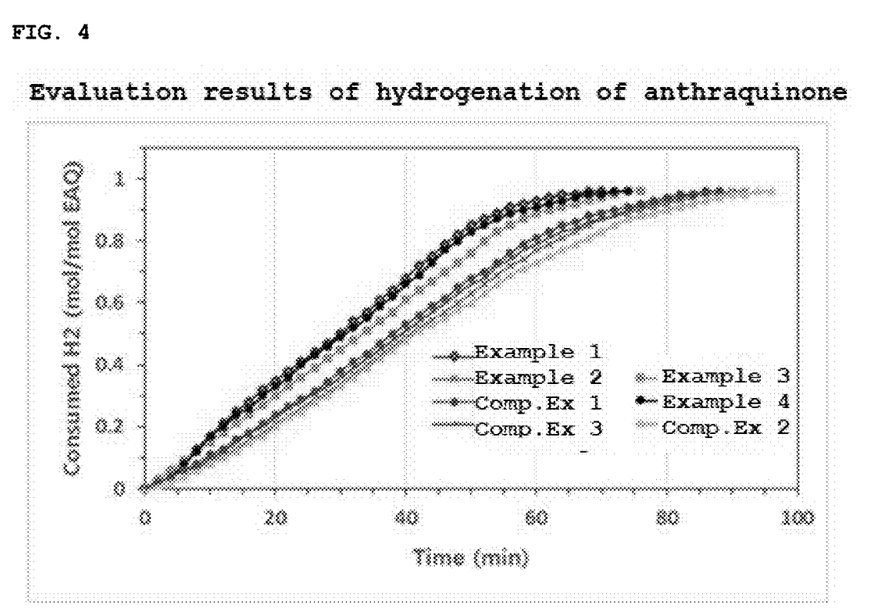
FIG. 4 shows evaluation results of hydrogenation of anthraquinone catalyzed by the catalyst according to the present disclosure.
Figure 5:
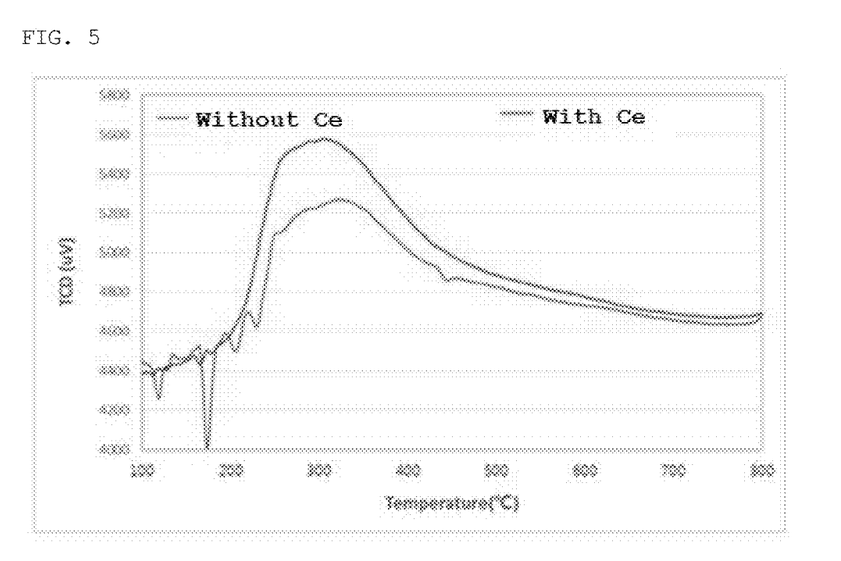
FIG. 5 shows TPO results of a catalyst with and without an addition of cerium according to the present disclosure.

The catalyst of Example 4 was prepared to have the same composition as that of Example 1. However, the concentrations of ethylene glycol and hydrochloric acid were doubled when loading palladium. As shown in FIG. 3, in this catalyst, magnesium and cerium were uniformly distributed inside the carrier, and palladium was uniformly distributed throughout the catalyst.

Comparative Example 1

In Comparative Example 1, a catalyst was prepared in the same manner as in Example 1, except that the carrier used in Example 1 was calcined at 850° C. and used. (The alumina was analyzed in a theta phase, and the alumina had a specific surface area of 120 m²/g).

Magnesium and cerium were uniformly distributed inside the carrier, and palladium was mainly distributed away from the outer edge of the carrier to have a thickness of 40 μm.

Comparative Example 2

In Comparative Example 2, a catalyst was prepared in the same manner as in Example 2, except that the carrier was calcined at 850° C. In this catalyst, magnesium and cerium were uniformly distributed inside the carrier, and palladium was mainly distributed away from the outer edge of the carrier to have a thickness of 40 μm.

Comparative Example 3

In Comparative Example 3, a catalyst was prepared using the same composition and carrier as in Comparative Example 1. However, the concentrations of ethylene glycol and hydrochloric acid were doubled when loading palladium. In this catalyst, magnesium and cerium were uniformly distributed inside the carrier, and palladium was uniformly distributed throughout the catalyst.

Performance Evaluation

In the present disclosure, the performance of the catalyst was evaluated using two methods.

A first method was through a hydrogenation reaction of anthraquinone to produce hydrogen peroxide through an oxidation process. A second method was through a regeneration reaction which regenerates the working solution made from a side reaction of the hydrogenation reaction.

1) Evaluation of Hydrogenation Performance

The hydrogenation reaction was carried out to measure a hydrogenation activity of the catalyst, and the evaluation was performed using a reactor having a stirred reactor system made of a quartz material. The working solution was prepared by dissolving 90 g of 2-ethylanthraquinone (2-EAQ) in 1 L of 1,3,5-trimethylbenzene and trioctyl phosphate in a 1:1 volume ratio. For the evaluation, 0.4 g of the catalyst was added to 30 ml of the working solution. The working solution with the added catalyst was placed in the reactor, a temperature of the reactor was maintained at 60° C., and a stirring speed of the stirrer was maintained at 5000 rpm. For the hydrogenation reaction, the inside of the reactor was purged with nitrogen gas to remove air inside the reactor, and then hydrogen gas was injected into the reactor. The hydrogen gas was filled so that a pressure inside the reactor was 0.3 MPa. A hydrogenated sample was oxidized with $O_2$ for 20 minutes at atmospheric pressure and room temperature and then extracted 5 times with deionized water. An aqueous solution of hydrogen peroxide obtained was moved to GC, and a quantitative analysis was performed using a flame ionization detector (FID).

Selectivity for EAQH2 was calculated on the basis of an amount of by-products other than hydrogen peroxide and ethyltetrahydroanthrahydroquinone (H4EAQH2).

Selectivity for $EAQH2$=[Generated $EAQH2$/Reacted $EAQ$]×100%

Reacted $EAQ$=[$EAQH2$+$H4EAQH2$+by-products]

2) Evaluation of THAQ Regeneration Performance

A reaction for regeneration evaluation was performed to measure a regeneration efficiency of the catalyst, and the evaluation was performed using a reactor having a stirred reactor system made of a SUS material. A magnetic bar was placed inside a circular stirred reactor, and 10 g of the catalyst was added to 50 g of a working solution of the by-products generated during the hydrogenation reaction to measure the regeneration efficiency. The measuring was done using LC. Results are summarized in Table 1 below.

TABLE 1

Evaluation results of THAQ regeneration efficiency (fresh catalyst)

| Category | Replicate | Example 1 | Example 2 | Example 3 | Example 4 | Comparative Example 1 | Comparative Example 2 | Comparative Example 3 |
|---|---|---|---|---|---|---|---|---|
| THAQ conversion rate (%) | 1 | 59.7 | 56.3 | 53.0 | 58.5 | 57.8 | 55.5 | 56.4 |
| | 2 | 58.1 | 56.3 | 57.7 | 58.7 | 58.5 | 57.5 | 59.5 |
| | 3 | 66.1 | 59.8 | 64.1 | 65.8 | 61.1 | 58.1 | 61.2 |
| | 4 | 64.6 | 58.2 | 62.6 | 63.8 | 60.6 | 58.6 | 61.9 |
| | 5 | 63.0 | 55.2 | 62.1 | 62.1 | 58.6 | 55.2 | 58.4 |
| | 6 | 60.4 | 54.8 | 58.5 | 58.5 | 54.6 | 53.1 | 55.1 |
| | 7 | 58.4 | 53.0 | 57.1 | 57.5 | 53.5 | 48.7 | 53.4 |
| | Min. | 58.1 | 53.0 | 53.0 | 57.5 | 53.5 | 48.7 | 53.4 |
| | Max. | 66.1 | 59.8 | 64.1 | 65.8 | 61.1 | 58.6 | 61.9 |

Meanwhile, TPO results depending on the addition of cerium to the catalyst are described below. Results of raising the temperature by injecting $O_2$ into the reduced catalyst show that an amount of $O_2$ adsorbed by the catalyst to which Ce was added is larger than the amount of $O_2$ adsorbed by the catalyst without Ce. The coke may be deposited on the catalyst due the working solution, and periodic regeneration of the catalyst may be required. On the basis of the results described above, when regenerating the deposited coke, the addition of Ce to the catalyst is expected to increase the regeneration efficiency.

The invention claimed is:

1. A catalyst applied to a hydrogenation step of producing hydrogen peroxide using an anthraquinone method, wherein the catalyst comprises a palladium component distributed in a ring shape around an alumina sphere and wherein a magnesium component and a cerium component are uniformly distributed in the alumina sphere, and
wherein the ring shape is 5 to 8 μm away from a surface of the alumina sphere and formed to have a thickness of 10 to 20 μm.

2. A method of preparing the catalyst of claim 1, wherein activated alumina is impregnated with aqueous solutions of magnesium and cerium, calcined, and treated with an aqueous solution of palladium to load a palladium component.

3. The method of claim 2, wherein the contents of magnesium and cerium impregnated in the activated alumina are 1 to 10 wt % and 0.10 to 0.25 wt %, respectively, with respect to the weight of the magnesium- and cerium-impregnated activated alumina after the calcination.

4. The method of claim 2, wherein the content of palladium loaded after the calcination is 0.1 to 10 wt % with respect to the weight of the catalyst after the loading.

5. A method of producing hydrogen peroxide comprising the steps of:
   a) contacting the catalyst of claim 1 with alkyl anthraquinone in the presence of hydrogen to form alkyl anthrahydroquinone; and
   b) oxidizing the alkyl anthrahydroquinone to produce the hydrogen peroxide.

* * * * *